United States Patent
Haghanifar et al.

(10) Patent No.: US 11,747,700 B2
(45) Date of Patent: Sep. 5, 2023

(54) SUPEROMNIPHOBIC, FLEXIBLE AND RIGID SUBSTRATES WITH HIGH TRANSPARENCY AND ADJUSTABLE HAZE FOR OPTOELECTRONIC APPLICATION

(71) Applicant: UNIVERSITY OF PITTSBURGH—OF THE COMMONWEALTH SYSTEM OF HIGHER EDUCATION, Pittsburgh, PA (US)

(72) Inventors: Sajad Haghanifar, Pittsburgh, PA (US); Paul W. Leu, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 506 days.

(21) Appl. No.: 16/656,996

(22) Filed: Oct. 18, 2019

(65) Prior Publication Data
US 2020/0124937 A1 Apr. 23, 2020

Related U.S. Application Data

(60) Provisional application No. 62/747,162, filed on Oct. 18, 2018.

(51) Int. Cl.
G02F 1/16755 (2019.01)
G02F 1/1337 (2006.01)
(Continued)

(52) U.S. Cl.
CPC .... *G02F 1/16755* (2019.01); *G02F 1/133305* (2013.01); *G02F 1/133734* (2013.01);
(Continued)

(58) Field of Classification Search
CPC ............. G02F 1/16755; G02F 1/16756; G02F 1/133305; G02F 1/133734; G02F 1/133792; G02F 1/0113; G02F 2202/36
See application file for complete search history.

(56) References Cited

U.S. PATENT DOCUMENTS 8,017,234 B2 * 9/2011 Jin .......................... C03C 17/22
428/376
2007/0009709 A1 * 1/2007 Krishnan ................ B08B 17/06
428/141

(Continued)

*Primary Examiner* — Nathanael R Briggs
(74) *Attorney, Agent, or Firm* — Carol A. Marmo; Eckert Seamans Cherin & Mellott, LLC

(57) ABSTRACT

The invention relates generally to optically high transparency and adjustable haze, superomniphobic, rigid and flexible structures and, more particularly, to fused silica glass and flexible plastic, e.g., polymer, structures having a sub-wavelength texture formed on a surface thereof, which is effective to impart the optical properties of high transparency and adjustable haze to the structures. The texture is reentrant. Additionally, the optically high transparency and adjustable haze structures include a silicon dioxide coating applied to the texture and a treatment of a low surface energy material deposited on the silicon dioxide coating. The silicon dioxide coating renders the structures super hydrophilic, and the low surface energy material treatment renders the structures superomniphobic.

16 Claims, 13 Drawing Sheets

(a)

(b)

(c)

(51) Int. Cl.
*G02F 1/1333* (2006.01)
*G02F 1/01* (2006.01)

(52) U.S. Cl.
CPC ...... *G02F 1/0113* (2021.01); *G02F 1/133792* (2021.01); *G02F 2202/36* (2013.01)

(56) References Cited

U.S. PATENT DOCUMENTS

| 2008/0047604 A1* | 2/2008 | Korevaar | H01L 31/075 |
| | | | 136/258 |
| 2018/0059291 A1* | 3/2018 | Li | G03F 7/0002 |

* cited by examiner (a)

(b)

(c)

SUPEROMNIPHOBIC, FLEXIBLE AND RIGID SUBSTRATES WITH HIGH TRANSPARENCY AND ADJUSTABLE HAZE FOR OPTOELECTRONIC APPLICATION

CROSS-REFERENCE TO RELATED APPLICATION

This application claims priority under 35 U.S.C. § 119(e) to U.S. Provisional Patent Application Ser. No. 62/747,162, filed Oct. 18, 2018, entitled "SUPEROMNIPHOBIC, FLEXIBLE AND RIGID SUBSTRATES WITH HIGH TRANSPARENCY AND HIGH HAZE FOR OPTOELECTRONIC APPLICATION", which is herein incorporated by reference.

GOVERNMENT SUPPORT

This invention was made with government support under 1552712 awarded by the National Science Foundation (NSF). The government has certain rights in the invention.

FIELD OF THE INVENTION

The invention relates generally to superomniphobic structures having high transparency and adjustable haze, which include a treated sub-wavelength texture, e.g., nanostructured pattern, formed on a flexible or rigid substrate. More particularly, the invention is applicable to flexible and rigid electronic and optoelectronic structures.

BACKGROUND

There is great interest in combining superomniphobicity with high performance photon management properties for optoelectronic applications such as displays, solar cells, smart phones, tablets, light emitting diodes (LEDs), and e-paper, as well as emerging flexible versions of these optoelectronic devices and new wearables, RF-ID tags, artificial skin, and the Internet of Things. Omniphobic surfaces, which have the ability to repel different liquids, such as various oils and alcohols, provide for a variety of important functionalities such as stain resistance, anti-fogging, chemical shielding, anti-icing, and self-cleaning. Developing surfaces that are superomniphobic, where the contact angle of a wide variety of oils or liquids of different polarity is greater than 150° and contact angle hysteresis is low, is challenging compared to the development of surfaces that are superhydrophobic, where the water contact angle is greater than 150°. This is because the surface tensions of oil and other organic liquids are lower than water and thus, tend to spread more easily on surfaces.

Theoretical work has suggested that low surface energy, reentrant surfaces may achieve omniphobicity by creating robust solid-liquid-air interfaces consistent with Cassie-Baxter wetting. By reducing the solid-liquid contact area, these surfaces can exhibit high equilibrium contact angle and low contact angle hysteresis for a wide range of fluids. A variety of reentrant geometry structures, where the surface area at the top of structure is more than the bottom, such as T-shaped microstructures, overhanging nanostructures, nanonails, hierarchical structures, and mushroom-like micro pillars have been demonstrated for superomniphobicity. However, there has not been much work in combining superomniphobicity with photon management properties and tradeoffs between these properties are not fully understood.

In general, a photovoltaic device harvests solar energy, converting the incoming photons to charge carriers. To generate electrical power, photovoltaic systems are typically constructed outdoors to maximize light absorption from the sun. The cover substrate, which is the top layer of a solar cell, plays the key role in preventing both contamination and damage from a variety of sources, including dust, acid rain, and hail. However, this cover substrate can be easily contaminated in various environments while protecting photovoltaic systems. Therefore, the capability of capturing the incident photons and self-cleaning characteristics are both necessary for a solar cell device.

Transparent superomniphobic substrates have extensive applications in windows, eyeglasses, camera lenses, and solar cell systems. Combined with transparency and antireflection properties, a transparent superhydrophobic film provides for additional functionality often desired in these applications. Possessing the properties of self-cleaning and optical transparency, a thin, glass or flexible polymeric film could be applied for light management applications and would be attractive for commercial optoelectronic devices. Currently, fabrication methods for the development of rigid or flexible and transparent superomniphobic surfaces have become particularly desirable.

Light scattering is the process of changing the direction of light rays from their straightforward path. Rough surfaces scatter light to a greater degree than planar surfaces. Diffraction, refraction and reflection are the physical mechanisms in the light scattering process. As it applies to solar cells, light scattering may result in reduced reflection and an increased light path in the absorber (e.g., silicon, dye-sensitized material, gallium arsenide, and the like), which increases the absorption. This result may include several advantages, such as, reduced absorber material thickness, higher efficiency of solar cells and reduced cost.

The haze factor is a parameter to assess light-scattering efficiency of a transparent material, and is defined as the percent of diffuse, e.g., scattered, transmission to the total transmission, in accordance with the following equation:

$$\text{Haze Factor} = \frac{\text{Total Transmission} - \text{Direct Transmission}}{\text{Total Transmission}} \times 100\%$$

The diffuse transmission is the difference between total and direct transmission. In general, structures with haze factors of greater than 70% are considered high haze, and a total transmission of greater than 80% is considered high transparency.

The surface morphology of a substrate can control the transmission and haze factors. Applying a texture to the surface of the substrate is a common approach for creating a structure that exhibits both high haze and high transparency. The texture can be applied using various conventional techniques in the art, such as, sand blasting, powder blasting and acid etching. These techniques are known for use in creating textured glass referred to as "frosted glass". The textured structures formed by these techniques are larger than the wavelength of light and therefore, lack the tuneability that is required for use in advanced optoelectronic applications. Fabrication of a glass or plastic textured structure that has both haze and transparency above 80% has not been achievable based on the aforementioned conventional techniques. Additionally, as indicated, the textured glass or plastic structures produced by these techniques typically contain large surface features that cannot be integrated with optoelectronic devices.

There has been an increasing interest in rigid and flexible electronic and optoelectronic devices for a wide variety of applications. Semi-crystalline polyethylene terephthalate (PET) and polyethylene naphthalate (PEN) polymers are two main transparent flexible substrates and glass is the most common rigid substrate used in the development of flexible and rigid electronics. In general, these materials provide good resistance to solvents and a discrete tolerance to temperature, as well as intrinsic clarity that makes them suitable for integration with transparent materials, such as, indium tin oxide (ITO) and other transparent conductive oxides (TCO). TCOs are a component in thin film solar cells, which are usually placed on a side exposed to incident light, and demonstrate a combination of low electrical sheet resistance, and high optical transparency and high light trapping ability. TCOs include indium-doped tin oxide (ITO), fluorine-doped tin oxide (FTO) and aluminum-doped zinc oxide (AZO). The use of TCOs are needed to improve efficiency of thin-film solar cells by increasing light scattering and trapping.

For display applications, superomniphobic surfaces with high transparency and low haze is important. In contrast, high transparency, high haze substrates are desirable for applications such as organic-light-emitting-diodes (OLEDs) and solar cells, where high transparency and high haze may increase the out-coupling or in-coupling efficiency of photons, respectively. However, substrates that exhibit total transmission more than 80%, adjustable haze from 0.1% to more than 90%, and water and oil (with surface tension<50 mN/m) contact angle more than 150°, simultaneously, are not known in the art.

In order to overcome disadvantages associated with conventional texturing techniques and achieve an adjustable haze structure that is suitable for use in advanced flexible electronic and optoelectronic applications, reactive ion etching has been employed to create sub-wavelength nanostructures. The traditional processes utilizing reactive ion etching require generating a patterned metal as a mask for selective etching of an underlying substrate. The requirement of applying the pattern to a metal mask and subsequently transferring the pattern to a glass substrate, as compared to simply applying the pattern directly to the glass substrate, results in additional processing steps that increases the time and cost of fabrication and, in particular, large scale production.

Thus, there is a need in the art to develop sub-wavelength, textured or nano-patterned, superomniphobic, rigid and flexible structures that exhibit adjustable haze and high transparency, which are suitable for use in advanced electronics and optoelectronic applications, such as, displays, solar cells, LEDs and optical lenses.

A challenge in preparing multifunctional surfaces is the capability to balance surface roughness and transparency of antireflection coatings. The present invention provides superomniphobic structures having substrates selected from rigid substrates, such as glass, and flexible substrates, such as plastic, with reentrant nanostructures that may be fabricated through scalable processes. For example, in the case of a flexible substrate, bare PET has a water and ethylene glycol contact angle of 75±1.0° and 60±1.0°, respectively with a transparency and haze of 88.4% and 1.1% at 550 nm, respectively. In contrast, the reentrant nanostructure samples prepared according to the invention demonstrate superomniphobicity over a wide range of fluids with a transparency and haze of 86.4% and 96.4% at 550 nm, respectively. The contact angles for water (surface tension of 72.8 mN/m) and ethylene glycol (47.7 mN/m) are 172±1.5° and 161±1.6°, respectively, with a contact angle hysteresis of 2.0±0.6° and 3.0±0.5°. For even lower surface tension liquids, such as olive oil (32 mN/m) and hexadecane (27.7 mN/m), the water contact angles are still over 150° at 156±1.5° and 153±1.7°, respectively. The hysteresis for these liquids are 6.0±2.0° and 17.0±1.2°, respectively. These reentrant nanostructure PET substrates demonstrate superomniphobicity with the highest combination of transparency and haze at 550 nm as compared to PET substrates known in the art.

The nanostructure of the invention can be fabricated on both sides of the rigid and flexible substrates. For example, in the case of a rigid substrate according to the invention, single-side nanostructured glass exhibited 97.0% total transparency while double-side nanostructured glass exhibited 99.5% total transparency at 550 nm wavelength and less than 0.1% haze for both at the same wavelength. The glass showed broadband antireflection (<20%) even at high incidence angles of 70°. The specular reflection for single-side nanostructured glass and double-side nanostructured glass were 5.8% and 4.4% at 45° incident angle, respectively, while normal glass showed 8.3% reflection at the same incident angle. In addition, static water and ethylene glycol contact angles of 162.1±2.0° and 155.2±2.2°, respectively, for fused silica glass were demonstrated. The glass exhibits resistance to condensation or antifogging properties. The glass showed antifogging efficiency more than 90% and demonstrates water departure of droplets smaller than 2 μm. The glass showed self-healing behavior after 500 mechanical abrasion cycles with an abrasive pad and pressure of 1225 N m$^{-2}$. The abraded glass recovered its high water and oil contact angle after heating for 15 minutes.

SUMMARY OF THE INVENTION

In one aspect, the invention provides an optically high transparency, adjustable haze, superomniphobic, rigid or flexible structure that includes a glass or flexible polymer substrate, respectively, having a top surface and an opposing bottom surface; a sub-wavelength, nanostructured texture having a reentrant shape comprising a plurality of blades is formed on at least one of the top surface and the bottom surface of the substrate; a silicon dioxide coating is applied to the sub-wavelength, nanostructured texture; and a low surface energy material is deposited on the silicon dioxide coating.

The silicon dioxide coating can impart a super hydrophilic feature to the structure. In certain embodiments, the silicon dioxide coating thickness is varied between 5 nm to 1000 nm.

The low surface energy material can impart a superomniphobic feature to the reentrant structure.

The transmission at 550 nm wavelength can be greater than 80% and the haze adjustable from 0.1% to greater than 90%.

In certain embodiments, each of the water contact angle and oil contact angle is over 150°.

Further, in certain embodiments, the aforementioned transmission, haze and contact angle values are present simultaneously in the structure.

The plurality of blades in a high haze substrate can have a height from about 1-35 μm. In certain embodiments, the distance between each of the plurality of blades is from about 100-700 nanometers.

The plurality of blades in a low haze substrate can have a height from about 100-800 nm. In certain embodiments, the distance between each of the plurality of blades is from about 100-700 nanometers.

One of the top and bottom surfaces of the substrate can have the sub-wavelength, nano-structured reentrant texture formed thereon and the other of the top and bottom surfaces has a transparent conductor deposited thereon. The transparent conductor may be selected from the group consisting of metal nanowires, metal nanomesh, doped metal oxide and combinations thereof.

In another aspect, the invention provides a method of fabricating an optically high transparency, adjustable haze, superomniphobic, rigid and flexible structure. The method includes obtaining a fused silica glass or flexible polymer substrate having a top surface and a bottom surface; forming a sub-wavelength, nanostructured texture having a reentrant form comprising a plurality of blades on at least one of the top surface and the bottom surface of the substrate; applying a silicon dioxide coating to the sub-wavelength, nanostructured texture; and depositing a low surface energy material on the silicon dioxide coating.

The forming step can include reactive ion etching.

The silicon dioxide coating may be applied by a plasma enhanced chemical vapor deposition technique. The low surface energy material may be applied by a vapor deposition and spin coating techniques.

The etch rate can be tuned or controlled to correspondingly tune or control morphology of the sub-wavelength, nano-structured texture, and the adjustable haze and high transparency of the structure.

DETAILED DESCRIPTION OF THE PREFERRED EMBODIMENTS

Figure 1:
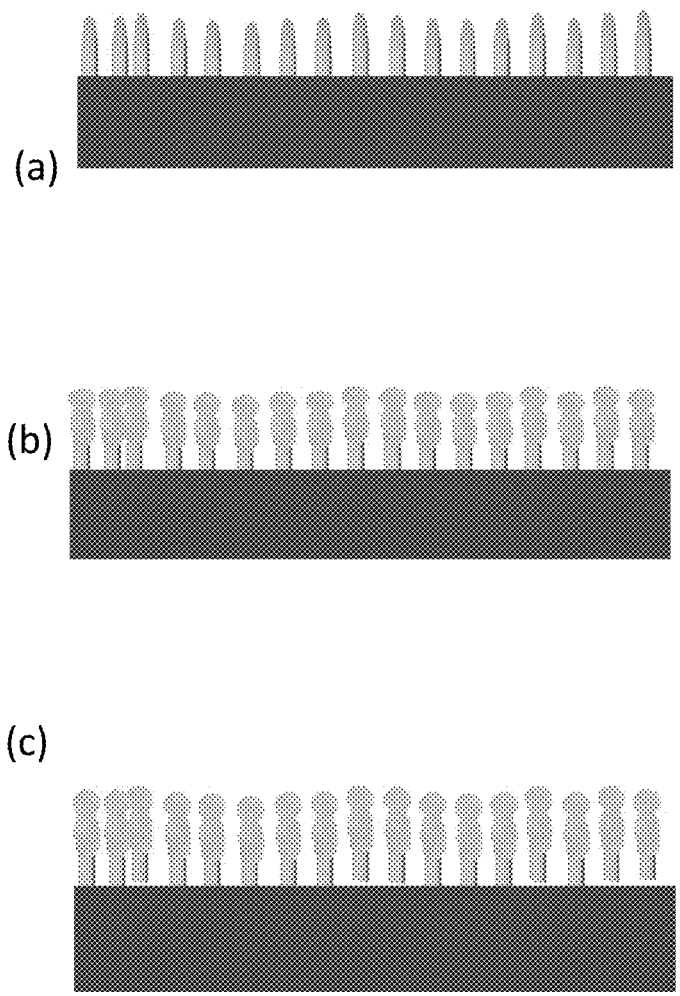
FIG. 1 shows fabrication process results for reentrant structures on PET and glass substrates including: view (a) reactive ion etching (RIE) of the PET and glass substrate to form nanograss, view (b) plasma enhanced chemical vapor deposition (PECVD) of silica, and view (c) fluorosilane treatment, in accordance with certain embodiments of the invention.

The present invention generally provides optically adjustable haze and high transparency, superomniphobic, rigid and flexible substrates. The invention is applicable to rigid and flexible electronic and optoelectronic structures. The rigid substrates include glass and the flexible substrates include plastic, e.g., polymer. The structures have a sub-wavelength, nano structured texture, e.g., nanopattern, applied to the substrate. The texture is reentrant. As used herein, the term "sub-wavelength" means the texture has dimensions less than the wavelength of the light employed. As used herein, the term "reentrant" means the surface area at the top of the blades or needles, e.g., nanograss, of the sub-wavelength, nano structured texture is larger than the bottom, and there is a distance between two adjacent blades or needles. Tall nano-structured texturing, e.g., nanopatterning, of the substrate increases light scattering, thereby creating a rigid and flexible structure that exhibits both high haze and high transparency. As used herein and the claims, "tall" nanostructured texturing has a height that is 1 μm or greater; "high" haze is a haze factor of greater than 70%, and "high" transparency is a total transmission of greater than 80%. Short nanostructured texturing, e.g., nanopatterning, of the substrate reduces light scattering, thereby creating a rigid and flexible structure that exhibits low haze and high transparency. As used herein and the claims, "short" nanostructured texturing has a height that is less than 1 μm, and "low" haze is less than 5% haze. The methods for fabricating the structures include applying the texture to at least one surface of the substrate, e.g., an upper surface and/or a lower surface. Additionally, the optically adjustable haze and high transparency structures include a silicon dioxide coating applied to the texture and a treatment of a low surface energy material deposited on the silicon dioxide coating. The silicon dioxide coating renders the structures super hydrophilic, and the low surface energy material treatment renders the structures superomniphobic.

Non-limiting examples of suitable glass for the rigid substrates, include but are not limited to, fused silica, soda lime glass and low iron tempered glass. Non-limiting examples of suitable polymers for the flexible substrates include, but are not limited to, semi-crystalline polyethylene terephthalate (PET) and polyethylene naphthalate (PEN) polymers. Transparent PET and PEN with adjustable haze can be an important component of a wide variety of flexible electronic devices. Generally, the optically high transparency and adjustable haze structures of the invention can be used in a wide variety of applications, such as but not limited to, light emitting diodes, traffic signs, backlit liquid crystal displays, touch screens, displays and solar cells. With respect to solar cells, light scattering may result in an increased light path in the absorber (silicon, dye-sensitized material, gallium arsenide, and the like), which increases the absorption, thereby providing several advantages, such as, reduced absorber material thickness, higher efficiency, and reduced cost. With respect to light emitting diodes, light scattering may result in an increased outcoupling of light from the emitter.

A sub-wavelength, nanostructured texture, e.g., nanopattern, is applied to one or more surfaces of the substrate. The texture can be applied to a top surface, an opposing bottom surface, or both of the top and bottom surfaces of the substrate. In general, the use of sub-wavelength textures, e.g., patterns, is known for imparting anti-reflective properties to optical substrates. Anti-reflective properties have been obtained in sub-wavelength, textured structures with an average period of approximately 100-700 nm. Increasing the haze factor to achieve a high haze structure without significantly decreasing the total transmission/transparency, can be achieved by additional scattering of light. Either of the top or bottom surfaces may include a transparent conductor. The transparent conductor may be selected from the group consisting of metal nanowires, metal nanomesh, doped metal oxide and combinations thereof.

The sub-wavelength texture applied to the surface of the rigid and flexible substrates include reentrant nanostructures. The overall thickness of the layer, e.g., height, and density of the texture can vary. Typically, the height of each individual reentrant structure e.g., blade or needle, within the web or layer is substantially consistent as compared to the other blades or needles. Furthermore, the distance between each of the blades or needles in the web or layer is also substantially consistent.

Fabrication of the sub-wavelength, textured structure includes obtaining a rigid glass or flexible polymer substrate, e.g., PET or PEN, and randomly depositing nanoscale polymer particles on the surface of the substrate. The deposited polymer particles form a layer thereon. Suitable polymers for use in depositing the texture can vary, and may be selected from those that are known in the art for this purpose. In certain embodiments, the polymer is a combination or blend of fluoroform ($CHF_3$), sulfur hexafluoride ($SF_6$), carbon tetrafluoride ($CF_4$), oxygen ($O_2$) and argon (Ar). The sub-wavelength, texture, e.g., nano-pattern, may be deposited using an etching process. Generally, the polymer employed for the texture has a "Teflon-like" composition and therefore, is etched significantly slower than the underlying substrates.

Various etching approaches and apparatus are known in the art, such as reactive ion etching that includes generating a patterned metal as a mask for selective etching of an underlying substrate, or mask-less reactive ion etching that precludes applying the pattern to a metal mask and subsequently transferring the pattern to a glass substrate and allows for applying the pattern directly to the glass substrate. In certain embodiments of the invention, nano structured superomniphobic glass and PET structures are produced. For the superomniphobic glass structures, the fabrication process is initiated with a bare glass substrate, and for the superomniphobic PET structures, the fabrication process is initiated with a bare PET substrate. Reactive ion etching (RIE) is conducted causing short nanostructures to form on a surface of each of the glass and PET substrates. Eventually, the etched surface of the substrate has formed thereon polymer needles, e.g., grass-like polymer texture or nano structures. Additional polymer is continually deposited on the sidewalls of the grass-like nanostructures that form, to protect the nanostructure from the isotropic etch of the process. Polymer deposited on the bottom of the nano structures is removed by a chemical sputtering effect of the accelerated ions. Appropriate combinations of the etching gases allow the etching to continuously create high aspect-ratio grass-like nanostructures during the fabrication process. The pressure, power and flow rate of the etching gases can be selected and varied, such as to tune or control the etch rate and resulting morphology of the nano-structured texture created on the surface of each of the glass and PET substrates, thereby allowing the haze and transparency of the substrates to be tuned, controlled and maximized.

The haze is adjustable from 0.1% to greater than 90% based on the height of the needles or blades of grass in the texture that is applied to the substrate. In certain embodiments, each needle or blade of grass in the texture applied to a glass or PET substrate has a height from about 1-35 µm, and a distance between the needles or blades from about 100-700 nanometers. This texture is effective to yield high haze and high transparency properties to each of the glass or PET substrate.

In certain other embodiments, each needle or blade of grass in the texture applied to a glass or PET substrate has a height from about 100-800 nm, and a distance between the needles or blades from about 100-700 nanometers. This texture is effective to yield low haze and high transparency properties to each of the glass or PET substrate.

In the present invention, the texture is reentrant wherein each blade has relatively similar, e.g., consistent, characteristics including shape and size, as compared to the other blades of the grass-like form. The distance between two adjacent grass blades can be approximately a few hundred nanometers, which is in the near UV to visible light wavelengths. The density, e.g., number of blades of grass, of the grass-like structure effects the amount of the light scattered, and the light scattering is directly related to the height of the grass-like structure. In certain embodiments, the structures have simultaneous total transmission/transparency and haze at 550 nm wavelength greater than 80% and greater than 90%, respectively. In other embodiments, the structures have total transmission/transparency more than 80% and adjustable haze from 0.1% to greater than 90%, at 550 nm wavelength, simultaneously. For example, a change in the height of the reentrant structure from 4 µm to 34 µm can result in a change in the haze factor from 60.4% to nearly 100%, respectively, while there is a change in the total transmission/transparency from 85.5% to 83.5%, respectively. Furthermore, in certain embodiments, the structures have simultaneous total transmission/transparency and haze at 550 nm wavelength greater than 80% and greater than 90%, respectively, and water and oil contact angles that are each over 150°; and in other embodiments, the structures have total transmission/transparency more than 80% and adjustable haze from 0.1% to greater than 90%, at 550 nm wavelength, simultaneously, and water and oil contact angles that are each over 150°.

Silicon dioxide ($SiO_2$) in the form of a thin film or coating is applied to the top side of the nano-structured texture, e.g., nano-pattern, such as blades of nanograss, using a conventional technique in the art, such as plasma enhanced chemical vapor deposition (PECVD). The thickness of the coating can vary. In certain embodiments, the $SiO_2$ coating has a thickness in a range from 5 nm to 1000 nm. As a result of applying the $SiO_2$ coating, the nanograss structure is super hydrophilic.

A final step of the fabrication process includes treating the surface of the nano-structured texture, e.g., nano-pattern, such as blades of nanograss, with a low surface energy material using a conventional technique in the art, such as vapor deposition and spin coating. There are various suitable low surface energy materials known in the art for use. In certain embodiments, the low surface energy material is fluorosilane. As a result of this step, the final nanograss structure is superomniphobic.

Whereas particular embodiments of the invention have been described herein for purposes of illustration, it will be evident to those skilled in the art that numerous variations of the details may be made without departing from the invention.

EXAMPLES

Reentrant structures were fabricated on PET and fused silica glass substrates using mask-less reactive ion etching (RIE) wherein nanoscale polymer particles including a combination of $CHF_3$, $SF_6$, $CF_4$, $O_2$ and Ar, were deposited on the substrates in accordance with certain embodiments of the invention. In the self-masking process, the pressure, power and flow rate of the etching gases were selected and varied, such as to tune or control the etch rate and the resulting morphology of the nanopatterned polymer textures created on the surface of the substrate; thereby allowing the haze and transparency of the substrate to be tuned, controlled and maximized. FIG. 1 shows details of the fabrication process and the resulting structures, i.e., the reentrant structures on PET and glass. Bare substrates in view (a) were etched by a mask-less reactive ion etching (RIE) process to create nanograss-like structures, and then in view (b) were coated with a silica layer using plasma enhanced chemical vapor deposition (PECVD) to create a reentrant nanostructures on top of the nanograss. Finally, as shown in view (c) the nanostructures were treated with a low surface energy fluorosilane using chemical vapor deposition and spin coating.

Figure 2:
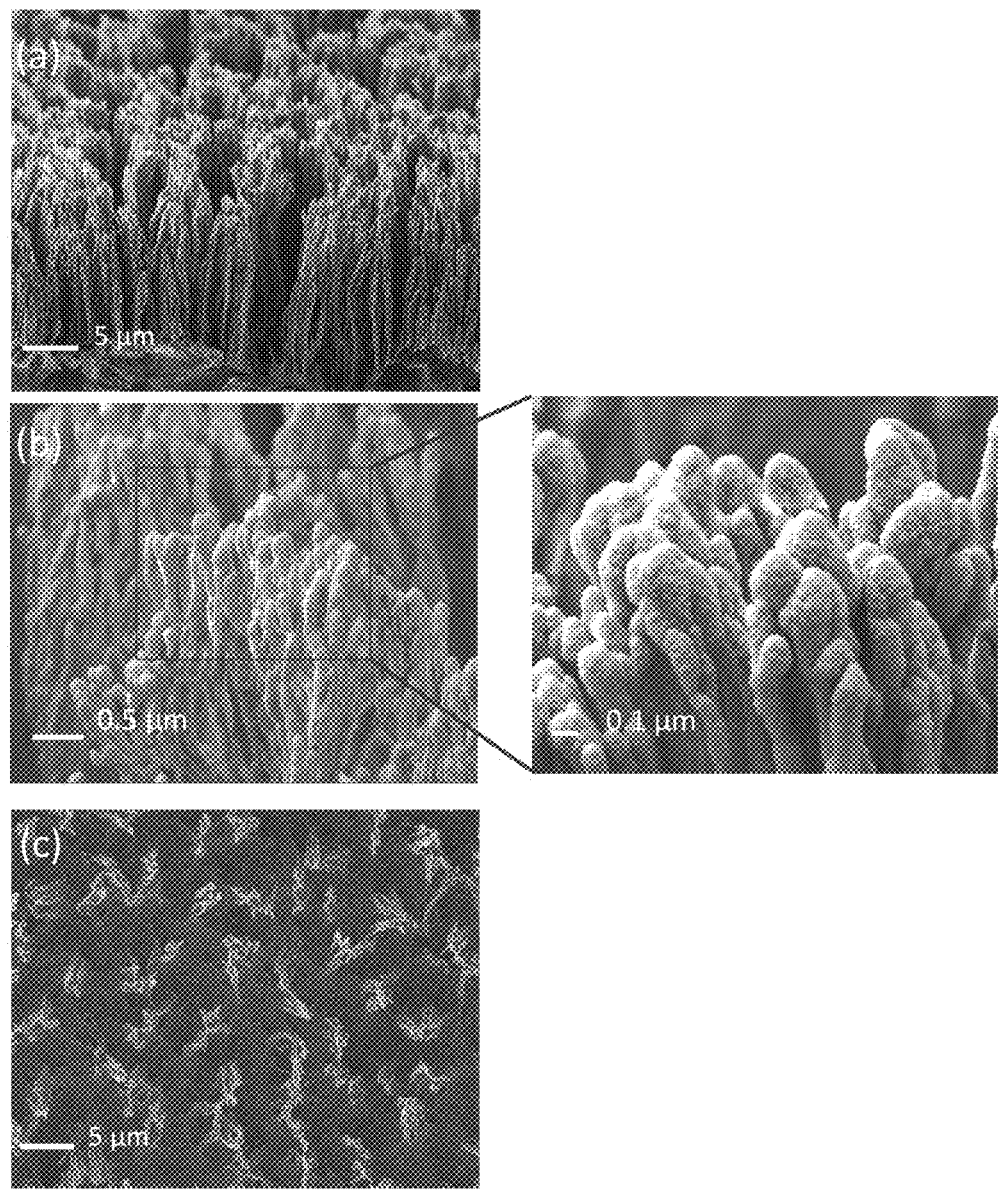
FIG. 2 shows scanning electron microscope (SEM) images of 18 μm tall reentrant nanostructures on high transparency and high haze flexible PET substrate, wherein each of the view (a) and view (b) shows 20° tilted cross section SEM images with different magnification and the view (c) shows overhead SEM images, in accordance with certain embodiments of the invention.

FIG. 2 shows scanning electron microscope (SEM) images of the fabricated structure on PET. View (a) shows 20° tilted cross section SEM images, view (b) shows larger magnification of the structure, and the view (c) shows overhead SEM images of the reentrant nano structure. The nanostructures were initially 18 μm in height after etching for 60 minutes. The initial structures had a diameter of about 50-100 nm at the bottom which gradually increased to 200-500 nm at the top. During the PECVD deposition of silica, more of the material was deposited on top of the nano structures, thus forming nanostructures with reentrant geometry. The subsequent fluorosilane treatment formed a monolayer of fluorosilane on the structure.

Figure 3:
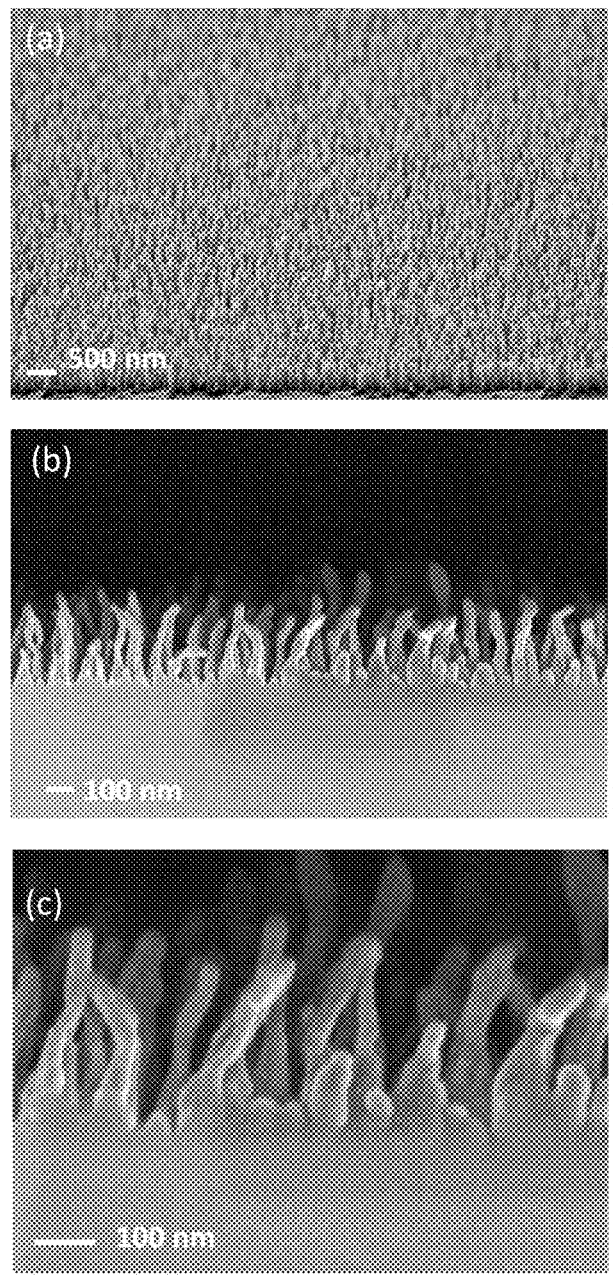
FIG. 3, view (a) shows 20° tilted, and views (b) and (c) show cross sectional SEM images of fabricated nanostructured glass with different magnifications, in accordance with certain embodiments of the invention.

FIG. 3 shows SEM images of the sub-wavelength, reentrant structure on high transparency low haze glass substrate, wherein view (a) shows 20° tilted SEM image and view (b) and (c) show cross sectional SEM images with different magnifications. The height of the pillars are approximately 100-500 nm and the distance between the pillars are between 20-100 nm. The diameter of the pillars are between 30-40 nm at the tops and 10-20 nm at the bottoms. The randomness in the height and spacing provide for broadband and omnidirectional antireflection like the glasswing butterfly wings.

Figure 4:
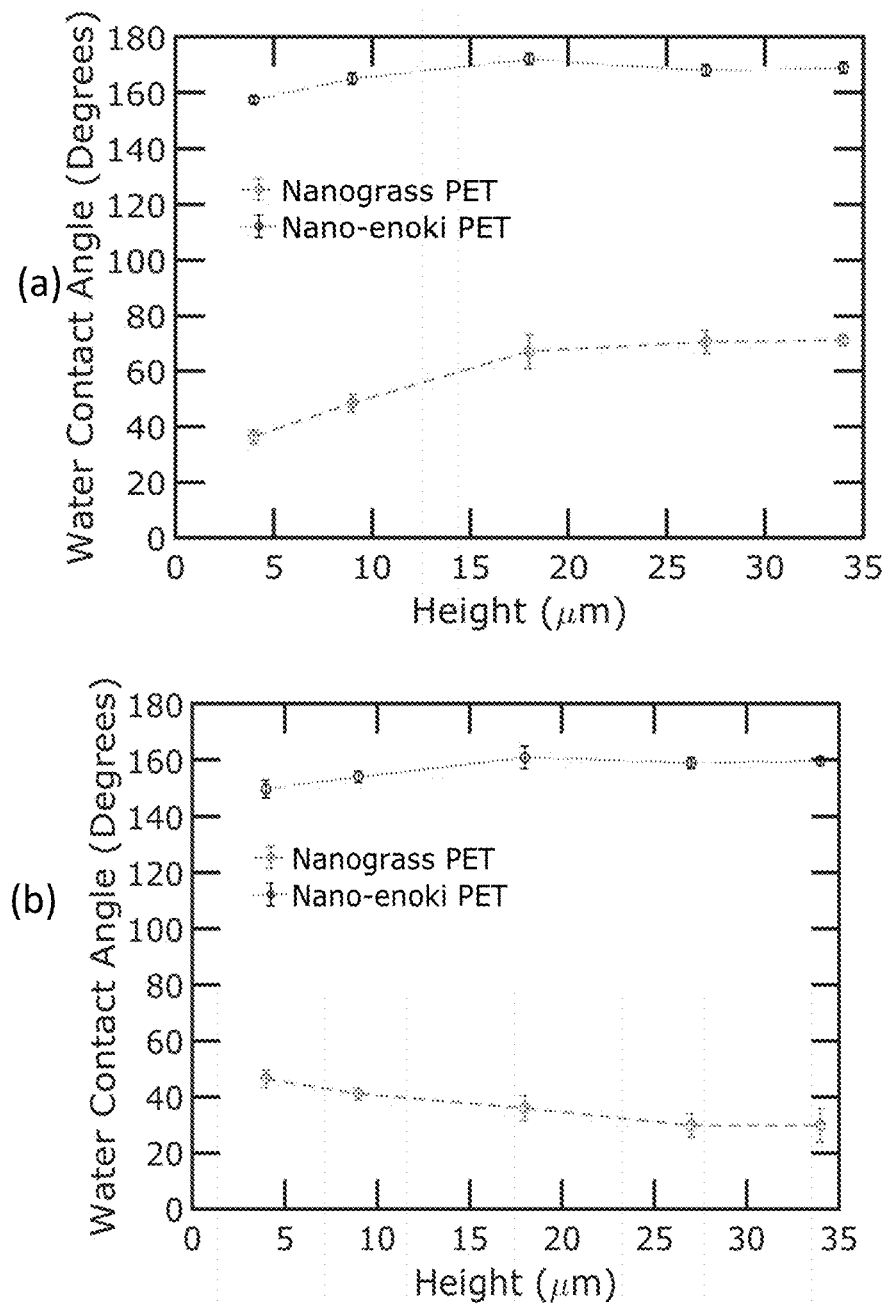
FIG. 4 shows the contact angle variation of nanostructured PET as a function of nanograss and reentrant nanostructure height for water in view (a) and ethylene glycol in view (b)

FIG. 4 views (a) and (b) show the contact angle variation as a function of reentrant nanostructure and nanograss height for water and ethylene glycol, respectively. As shown in the plots, the reentrant geometry and surface modification were critical to obtaining high contact angles.

Figure 5:
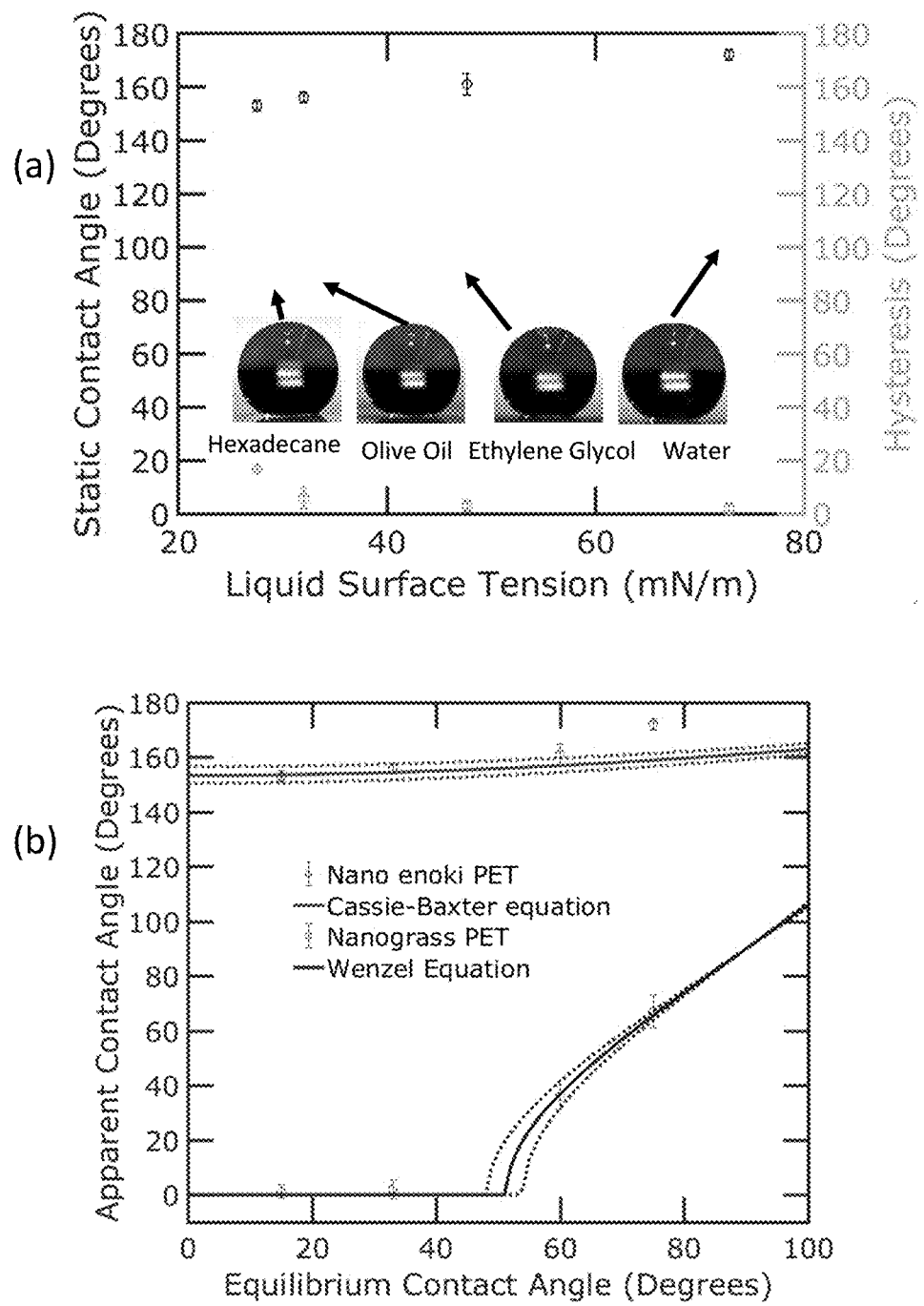
FIG. 5 shows in view (a) static contact angle (left y-axis) and hysteresis (right y-axis) of different liquids with different surface tension on the 18 μm tall reentrant nanostructured PET; and in view (b) apparent contact angle versus equilibrium contact angle for different liquids, in accordance with certain embodiments of the invention.

FIG. 5, view (a), shows the static contact angle (left y-axis) and hysteresis (right y-axis) as a function of liquid surface tension for the 18 um tall reentrant nanostructured PET for different liquids. The contact angle values were 172±1.5°, 161±1:6°, 156±1:5° and 153±1:7°, for water, ethylene glycol, olive oil and hexadecane, respectively. The contact angle hysteresis for each of the four liquids was 2.0±0.6°, 3.0±0.5°, 6.0±2.0° and 17.0±1.2°, respectively. The high apparent contact angles and small hysteresis angles of the reentrant nanostructures for a wide range of liquids demonstrated the superomniphobicity of these structures.

FIG. 5, view (b), plots the experimentally measured apparent contact angles with the predicted apparent contact angles from the Cassie-Baxter equation. The fit agrees well with the three types of oils measured indicating that the reentrant structure prevents the oils from infiltrating past the heads of the nano structures. However, the data point for water does not match the equation well, which may be because the area contact fraction of the water-vapor interface is substantially lower than that of the oils on the heads of the nano structures.

FIG. 5, view (b), also plots the experimentally measured apparent contact angles for nanograss PET with the predicted apparent contact angles from the Wenzel equation. As shown in the plot, the experimental data agreed well with that predicted from the Wenzel equation. For the liquids with equilibrium contact angle less than 50°, such as hexadecane and olive oil, the liquid completely spreads over the nanostructured surface. For liquids with higher surface tension such as water and ethylene, an apparent contact angle can be measured. In the cases where the surface is philic (equilibrium contact angle less than 90°), the Wenzel wetting state enhances the wetting and decreases the wetting contact angle.

Figure 6:
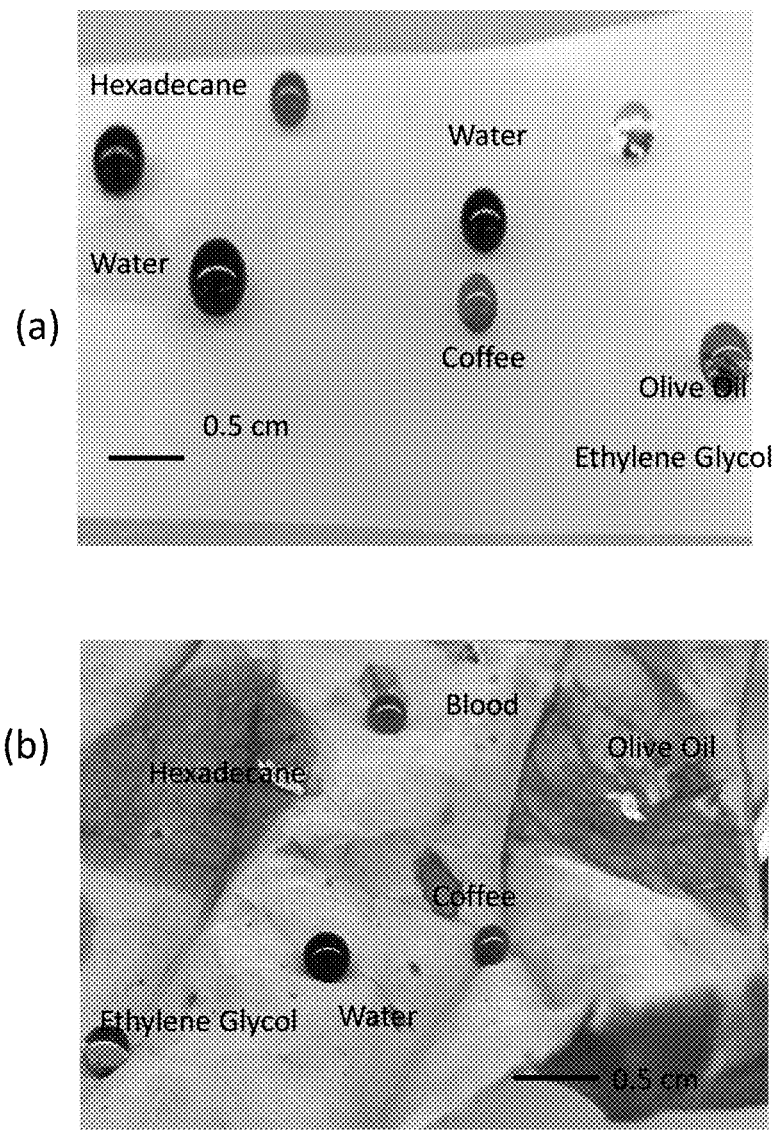
FIG. 6 shows optical pictures of various liquids on high transparency and high haze plastic demonstrating superomniphobicity in view (a), and the lotus leaf demonstrating superhydrophobicity in view (b), but an inability to repel the lower surface tension liquids of olive oil and hexadecane, in accordance with certain embodiments of the invention.

Liquid droplets of coffee, water, milk, mustard and hexadecane were applied to the surface of the nanostructured PET. FIG. 6, view (a), shows an optical image of the different liquid droplets on the nanostructured PET. FIG. 6, view (b), shows an optical image of different liquids on a lotus leaf. The lotus leaf shows high apparent contact angles for water, ethylene glycol, blood and coffee. However, the olive oil and hexadecane droplets spread spontaneously on the leaf.

Figure 7:
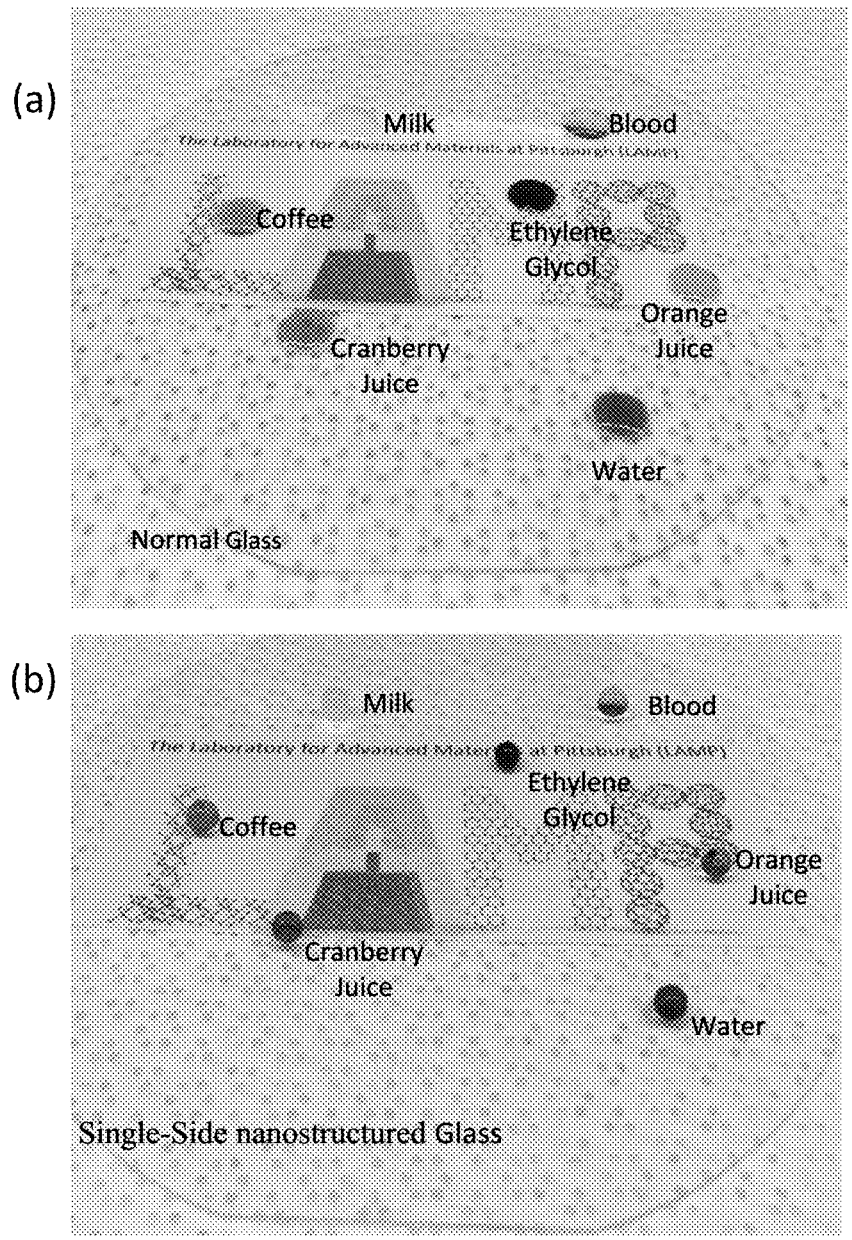
FIG. 7 shows droplets of different liquids in views (a) and (b) on normal and nanostructured superomniphobic glass, respectively, in accordance with certain embodiments of the invention.

FIG. 7, view (a), shows the static contact angle of a variety of liquids on top of normal glass. The bare fused silica has 42.9±1.1° and 18.7±0.7° contact angle for water and oil, respectively, with 35.5±2.7° hysteresis value for water. The hysteresis value for oil is not measurable, because it is very close to the contact angle. By creating re-entrant structure on the bare fused silica, the water and oil contact angles increase significantly to 162.1±2.0° and 155.2±2.2° with 3.2±0.7° and 9.4±3.6° hysteresis, respectively, as shown in FIG. 7, view (b). The contact angle for milk, coffee, blood, cranberry juice, orange juice, and water are all more than 158.0±3.0° with hysteresis less than 8.0±2.0°. Also, as shown in FIG. 7, view (b), the transparency of the nanostructured glass is high with no observable reflection and the text beneath the substrate is clearly visible.

Figure 8:
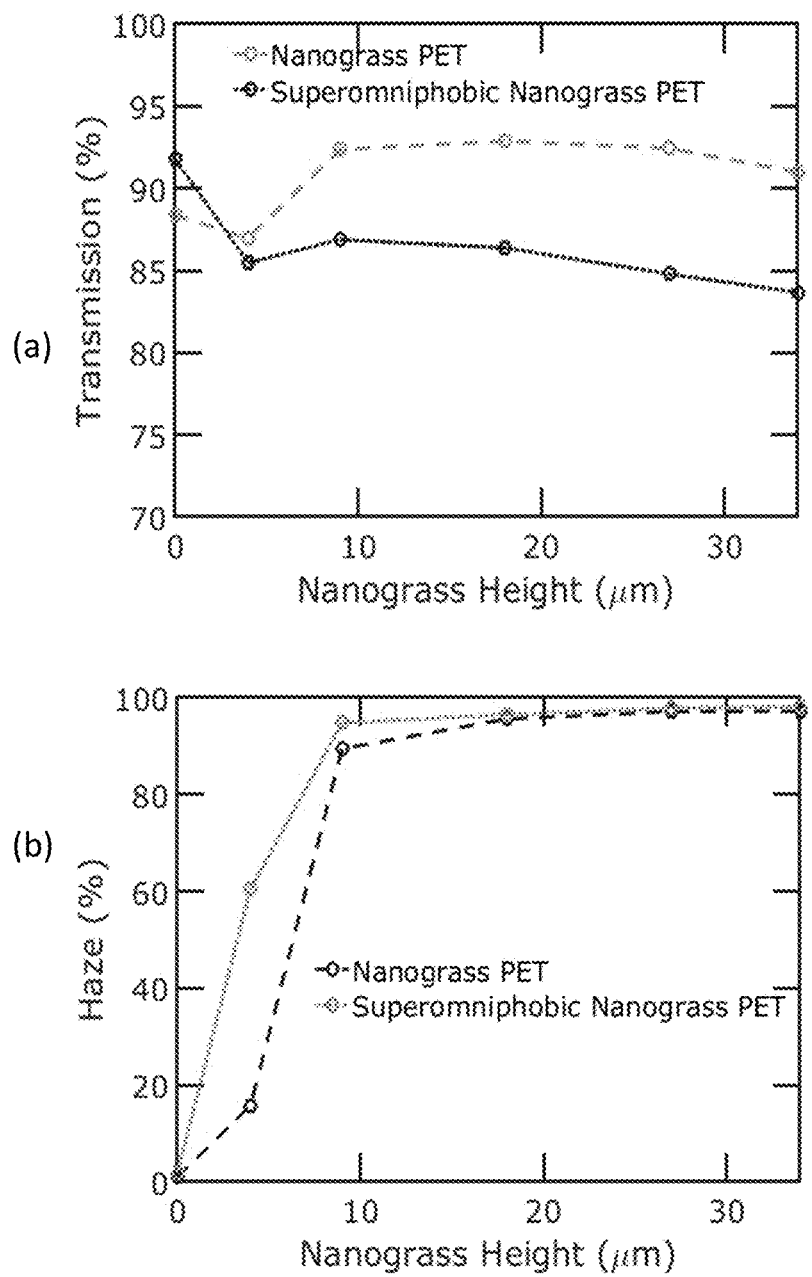
FIG. 8 shows optical transmission results as follows: view (a) total transmission of the two types of nanograss PET at 550 nm wavelength as a function of height; and view (b) haze of the various structures at 550 nm wavelength as a function of height, in accordance with certain embodiments of the invention.

The optical properties of the various samples were subsequently characterized. FIG. 8, view (a), shows the total transmission of the various flexible structures at 550 nm wavelength. The transmission of bare PET was 88.4% at 550 nm wavelength with negligible haze before conducting the PECVD process. After PECVD of silica, the transmission increased to 91.8% due to a reduction in reflection. The fluorosilane coating did not change the transmission since it was a monolayer in all samples. For the 4 mm nanograss PET, the transmission was initially 87.0% and haze was 15.7% at 550 nm wavelength. After PECVD deposition, the transmission decreased slightly to 85.5%, however, the haze increased significantly to 60.4%. Additional increases in nanograss PET height to 9 mm and 18 mm demonstrated an improvement in transparency across the entire spectrum to more than 91.0%. However, silica deposition reduced the transparency to 87.0% and 86.4% at 550 nm wavelength, while haze values increased to more than 96.0% for both. By increasing the height to 27 mm and more, the transmission dropped to less than 85.0% after PECVD process which is not suitable for optoelectronic applications.

FIG. 8, view (b), plots the haze at 550 nm as a function of nano structure height for various structures. For both nanograss PET and modified PET, haze increase monotonically with height of nanograss, however, for modified PET since some deposition occurred at the top area of nanograss, the improvement of haze was more than nanograss PET for all heights of nanograss.

Figure 9:
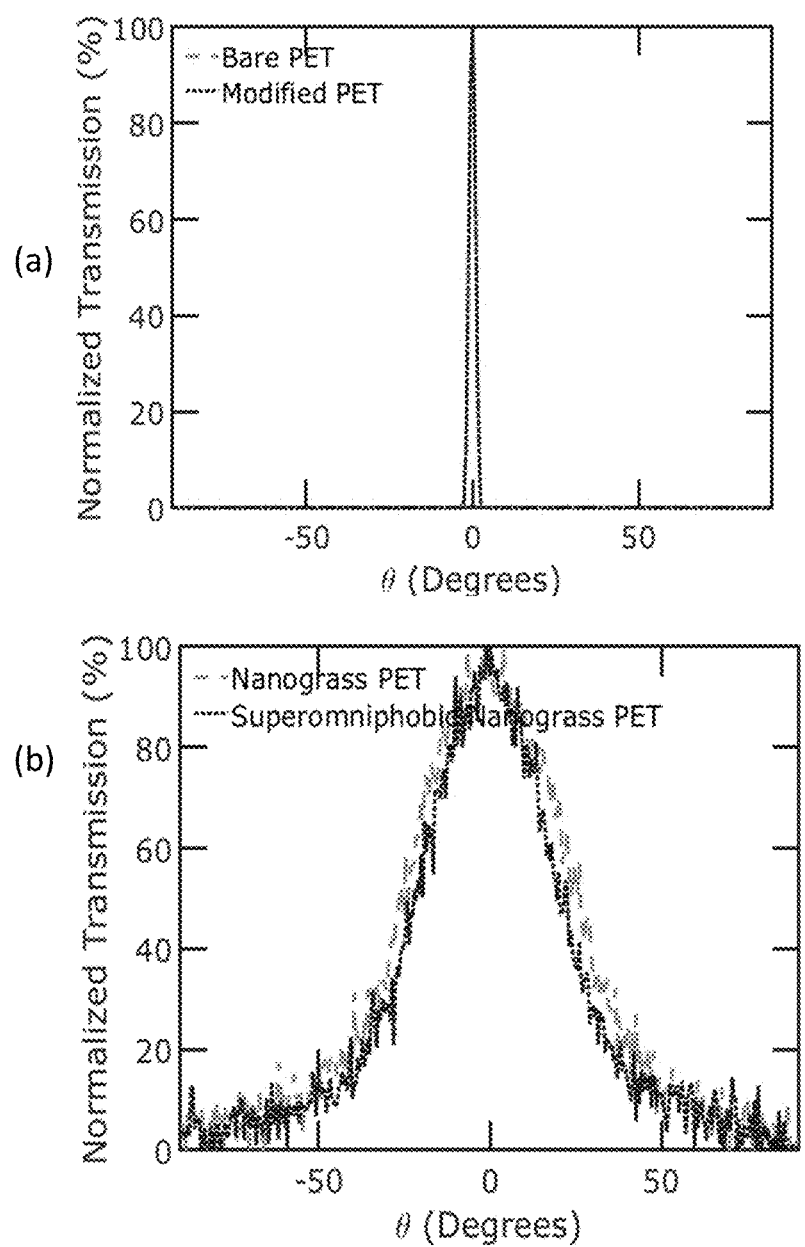
FIG. 9 shows scattering angular distribution of transmission for view (a) bare PET before and after PECVD and fluorination; and view (b) 18 mm height reentrant nanostructured PET after RIE and after PECVD and fluorination, in accordance with certain embodiments of the invention.

The angular distribution of the transmission was characterized through various substrates. FIG. 9, views (a) and (b), show the scattering angular distribution of transmission for bare PET before and after PECVD deposition and 18 mm height hazy PET before and after PECVD coating, respectively. As shown in these plots, the PECVD coating did not change the haze substantially in either sample. On bare PET, the PECVD only formed a 200 nm layer and did not change the haze as expected. On the nanograss PET, the PECVD also did not change the haze significantly. While the PECVD deposition reduced the transparency and merged some of the nanograss structures together, these additional interfaces may have compensated for the reduced scattering from reduced roughness. The scattering angle range, defined as the range of angles in which lights have more than 5% intensity of the highest intensity at 0°, was also characterized from these plots. The scattering angle ranges of the bare PET and PECVD-coated PET at wavelength of 550 nm were both 4°. The photo detector received light in a 6-degree cone so that there was substantial broadening on the light intensities measured, and the haze calculated directly from these plots differ from those measured with an integrating sphere. The haze of these samples at 550 nm were both less than 1%. For the 18 mm height hazy nanograss PET, the scattering angle range was 174° initially and 172° after PECVD coating. The haze of these samples were 95.5% and 96.4%, respectively. The ultra-high haze value (96.4%) and the 172° scattering angle range confirmed the very strong scattering ability of hazy PET even after PECVD deposition.

Figure 10:
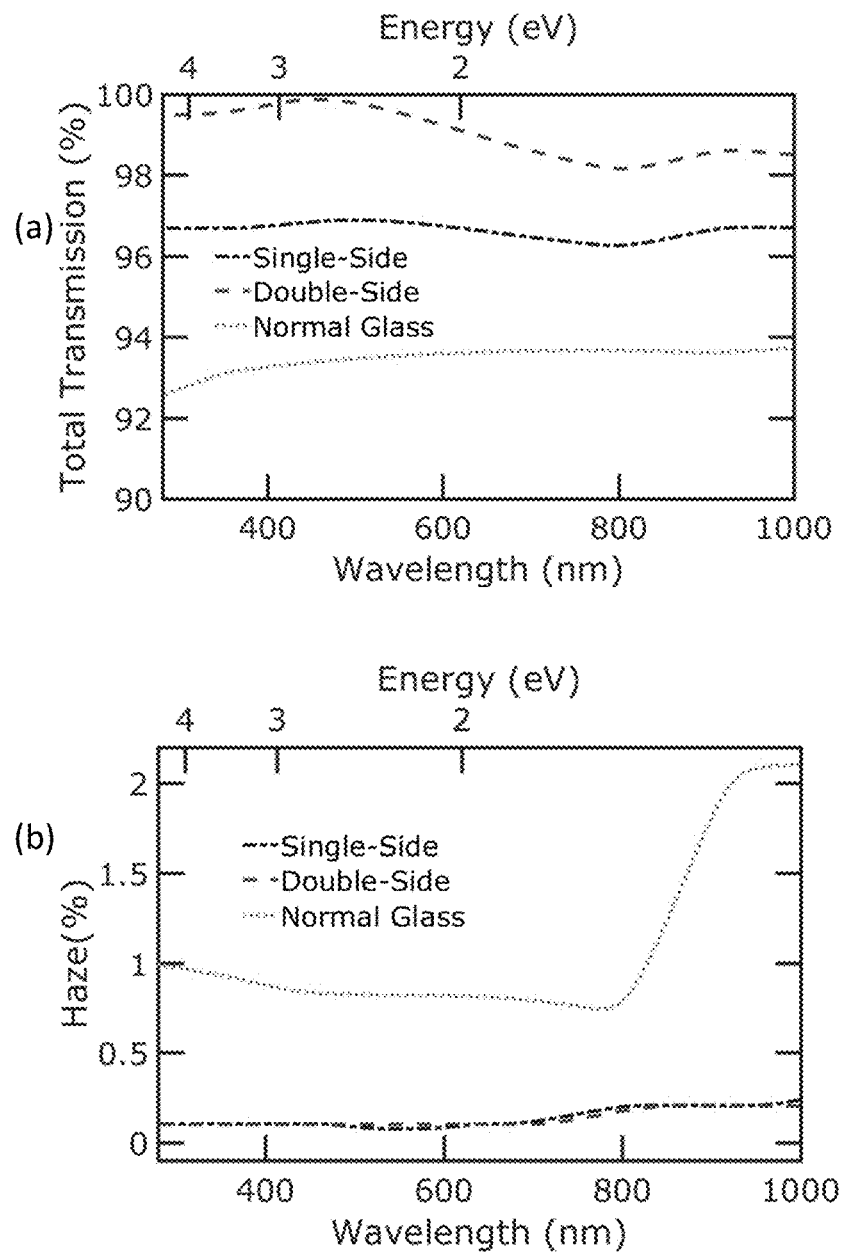
FIG. 10 shows in view (a) the total transmission and in view (b) haze plots as a function of wavelength for bare, single side and double side etched glass, in accordance with certain embodiments of the invention.

In FIG. 10, view (a) shows the total transmission and view (b) shows haze results for glass as a function of wavelength. The total transmission for bare fused silica is 93.5% and increases to 97.0% at 550 nm. The transmission spectra for both the bare glass and single-side nanostructured glass are fairly flat across the entire range of 280 to 1000 nm wavelength. The total transmission for the bare glass is between 93.1% to 94.0%, and the total transmission for the nanostructured glass is between 95.9% to 97.1%. The same nanostructures were also created on both sides of the glass and the total transmission of the double-side nanostructured glass at 550 nm is 99.5%. The transmission spectra for the double-sided glass is also fairly flat with total transmission between 98.1% to 99.9%. The corresponding values for haze are shown in FIG. 10, view (b). In both single-side and double-side nanostructured glass, the haze value reduces to less than 0.1% across a broadband range of wavelengths. For normal glass the haze value is between 2.2% and 0.9%; however, for nanostructured glass the haze value is fairly flat for the spectrum.

Figure 11:
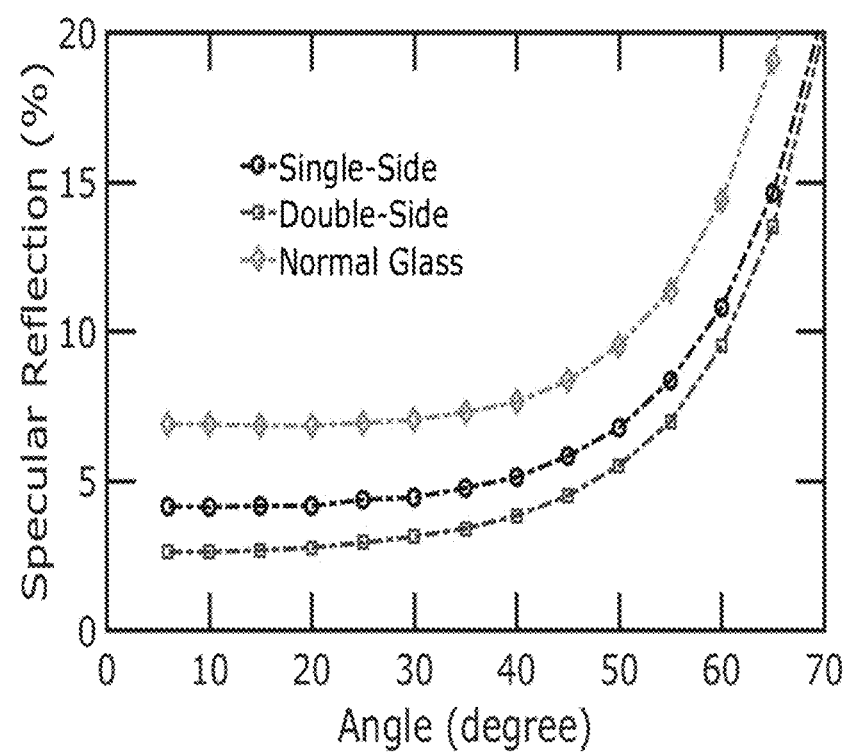
FIG. 11 shows the angle-resolved spectra for reflection at 550 nm wavelength for bare, single side and double side etched glass, in accordance with certain embodiments of the invention.

FIG. 11, shows the angle dependent specular reflection for normal glass, single side, and double side nanostructured glass. All the values of reflection for etched glass are less than 5% for both single side and double side etched glass up to 45°. However the reflection values are always less than glass even for a high incidence angle of 70°, which reveals the high omnidirectional, antireflective performance of our fabricated glass.

Figure 12:
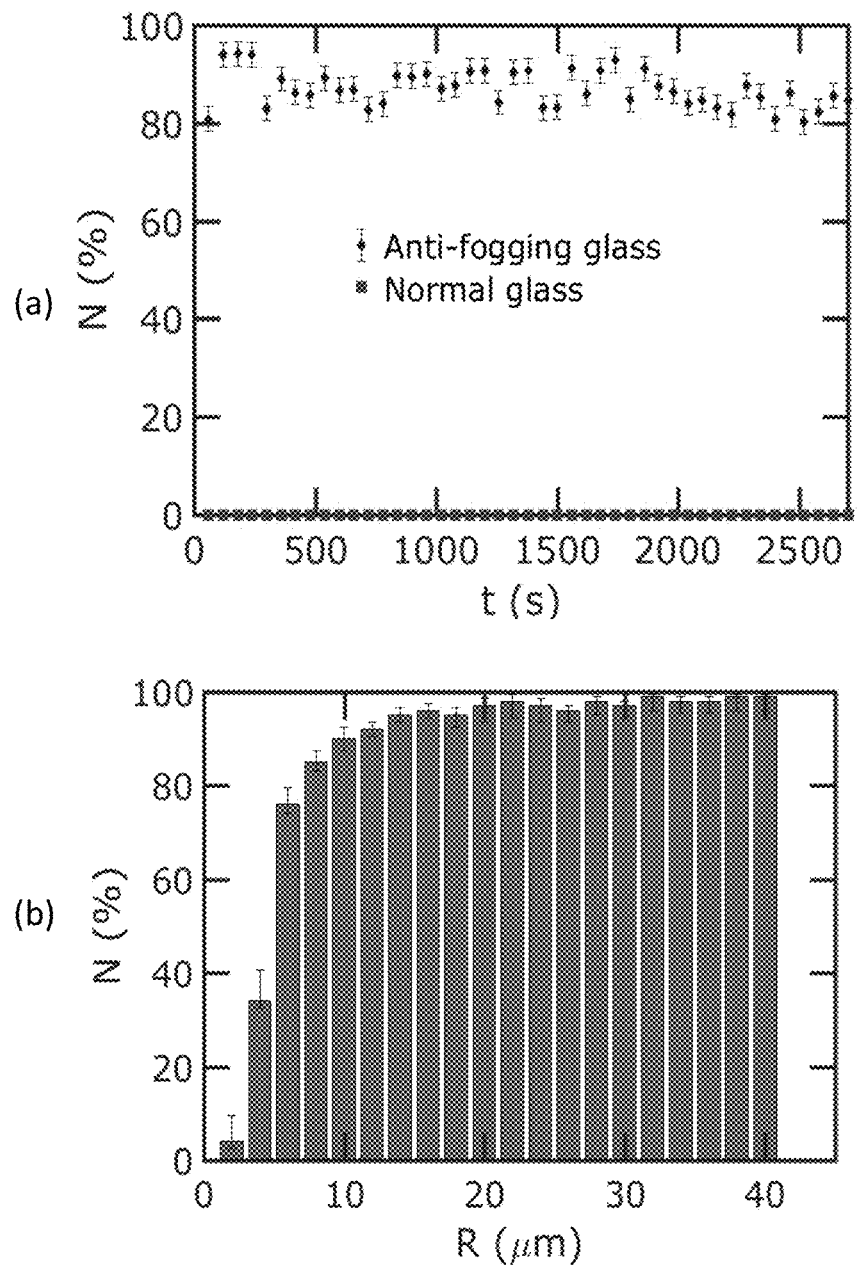
FIG. 12, view (a) plots the percentage of droplets dropping after coalescence versus time and view (b) shows the relationship of percentage of coalescences droplets jumping and radius of the droplet at the moment of dropping off, in accordance with certain embodiments of the invention.

FIG. 12, shows the antifogging ability of nanostructured glass. FIG. 12, view (a), plots of percentage of droplets dropping after coalescence versus time and view (b) shows the relationship of percentage of coalescences droplets jumping and radius of the droplet at the moment of dropping off.

Figure 13:
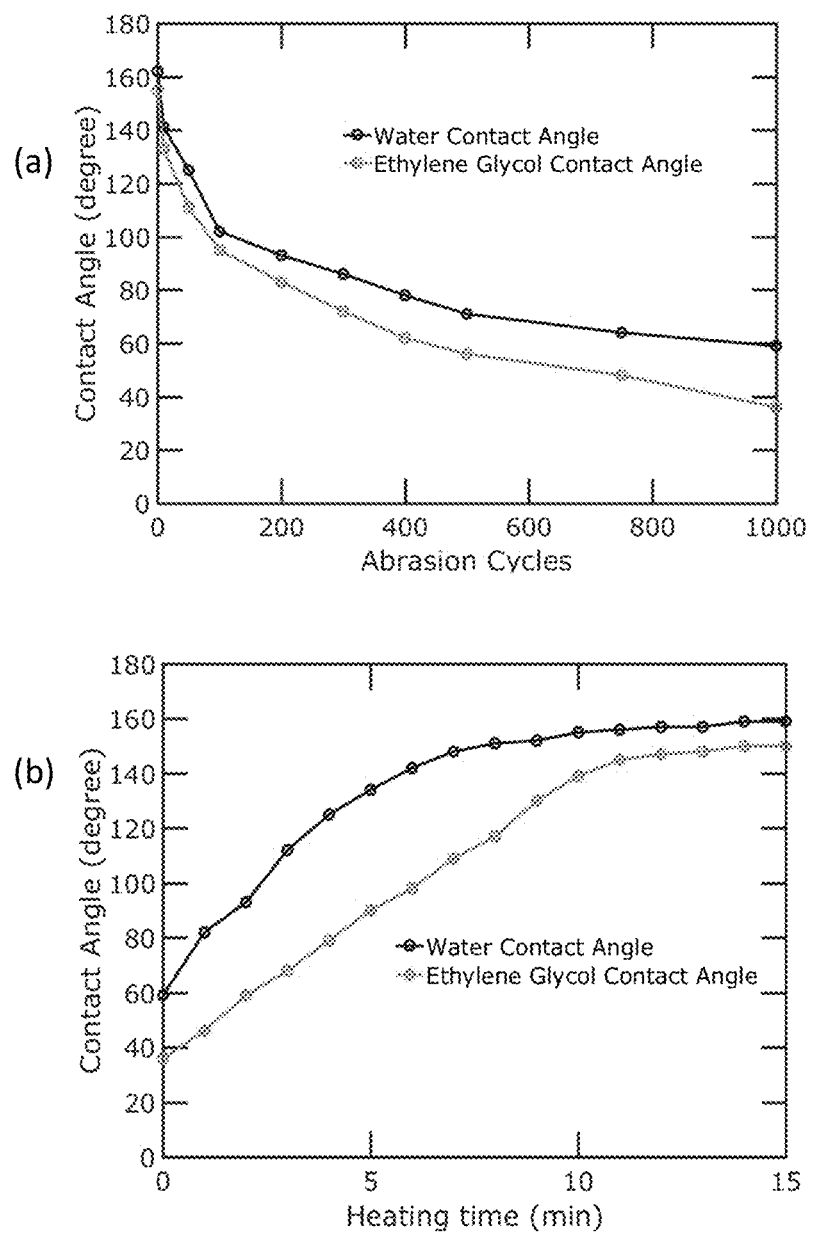
FIG. 13, shows water and oil contact angle versus abrasion cycle in view (a) and after heating the abraded samples in view (b), in accordance with certain embodiments of the invention.

FIG. 13, view (a), shows the behavior of water and ethylene glycol contact angle during repeated abrasion cycles with pressure of 1225 N m$^{-2}$. For both water and oil, the contact angles decrease to less than 90° after approximately 400 cycles of abrasion. However, the mobility of fluorine molecules provides a path for self-healing, similar to that of epitucular wax in plant cuticles. FIG. 13, view (b) shows how the water and oil contact angle increase after a heat treatment at 95° C. After only 15 minutes of heating, the contact angles for both liquids recover.

We claim:
1. A superomniphobic structure, comprising:
  a substrate selected from the group consisting of a rigid substrate and a flexible substrate, having a top surface and an opposing bottom surface;
  a sub-wavelength, reentrant, nanostructured texture formed on at least one of the top surface and the bottom surface of the substrate, the texture comprising:
    a plurality of nanostructures comprising polymer, selected from the group consisting of needle, blade, and combinations thereof;
    a distance between each of the plurality of nanostructures from about 100 nm to about 700 nm;
    a height of the plurality of nanostructures in a range from about 1 µm to about 35 µm to produce simultaneous high haze and high transparency, or a height of the plurality of nanostructures in a range from about 100 nm to about 800 nm to produce simultaneous low haze and high transparency, wherein the height of each individual reentrant nanostructure is substantially consistent as compared to the other reentrant nanostructures, wherein the haze is adjustable from 0.1% to greater than 90% based on the height of the plurality of nanostructures, wherein the distance between each of the reentrant nanostructures is substantially consistent;

a silicon dioxide coating applied to the sub-wavelength, nanostructured texture; and a low surface energy material deposited on the silicon dioxide coating, wherein the high haze corresponds to a haze factor of greater than 70% and the low haze corresponds to a haze factor of less than 5%, and wherein the high transparency corresponds to a total transmission of greater than 80%.

2. The structure of claim 1, wherein the rigid substrate comprises glass.

3. The structure of claim 2, wherein the glass is selected from the group consisting of fused silica and soda lime glass and low iron tempered glass.

4. The structure of claim 1, wherein the flexible substrate comprises plastic.

5. The structure of claim 4, wherein the plastic is selected from the group consisting of polymer.

6. The structure of claim 5, wherein the polymer is selected from the group consisting of semi-crystalline polyethylene terephthalate and polyethylene naphthalate.

7. The structure of claim 1, wherein the silicon dioxide coating imparts super hydrophilic feature to the structure.

8. The structure of claim 1, wherein the low surface energy material imparts superomniphobic feature to the structure.

9. The structure of claim 1, wherein transmission and haze at 550 nm wavelength are greater than 80% and greater than 0.1% to more than 90%, respectively.

10. The structure of claim 1, wherein the water contact angle and oil contact angle are each over 150°.

11. The structure of claim 1, wherein the silicon dioxide coating is 5-1000 nm thick.

12. The structure of claim 1, wherein one of the top and bottom surfaces of the substrate has the sub-wavelength, nanostructured texture formed thereon and the other of the top and bottom surfaces has a transparent conductor deposited thereon.

13. The structure of claim 12, wherein the transparent conductor can be selected from the group consisting of metal nanowires, metal nanomesh, doped metal dioxide and combinations thereof.

14. A method of fabricating a superomniphobic structure, comprising:
    obtaining a substrate selected from the group consisting of a rigid substrate and a flexible substrate, having a top surface and a bottom surface;
    forming a sub-wavelength, nanostructured texture comprising a reentrant structure on at least one of the top surface and the bottom surface of the substrate, the texture comprising:
        a plurality of nanostructures comprising polymer, selected from the group consisting of needle, blade, and combinations thereof;
        a distance between each of the nanostructures from about 100 nm to about 700 nm;
        a height of the plurality of nanostructures in a range from about 1 µm to about 35 µm to produce simultaneously high haze and high transparency, or a height of the plurality of nanostructures in a range from about 100 nm to about 800 nm to produce simultaneous low haze and high transparency,
    wherein the height of each individual reentrant structure is substantially consistent as compared to the other reentrant structures,
    wherein the haze is adjustable from 0.1% to greater than 90% based on the height of the plurality of nanostructures,
    wherein the distance between each of the reentrant structures is substantially consistent;
    applying a silicon dioxide coating to the sub-wavelength, nanostructured texture; and
    depositing a low surface energy material on the silicon dioxide coating,
    wherein the high haze corresponds to a haze factor of greater than 70% and the low haze corresponds to a haze factor of less than 5%, and
    wherein the high transparency corresponds to a total transmission of greater than 80%.

15. The method of claim 14, wherein the forming step comprises reactive ion etching.

16. The method of claim 14, wherein the silicon dioxide coating is applied by a plasma enhanced chemical vapor deposition technique, and the low surface energy material is applied by a vapor deposition and spin coating technique.

* * * * *